United States Patent [19]
Block et al.

[11] Patent Number: 4,484,217
[45] Date of Patent: Nov. 20, 1984

[54] METHOD AND SYSTEM FOR REMOTE REPORTING, PARTICULARLY FOR PAY TELEVISION BILLING

[75] Inventors: Robert S. Block, Marina Del Ray; John M. Lull, Fullerton, both of Calif.

[73] Assignee: Telease, Inc., Los Angeles, Calif.

[21] Appl. No.: 377,080

[22] Filed: May 11, 1982

[51] Int. Cl.³ .............................................. H04N 7/18
[52] U.S. Cl. ...................................... 358/84; 358/86; 358/114; 455/2; 455/4
[58] Field of Search ............... 358/84, 86, 114, 115, 358/117; 455/2, 4

[56] References Cited

U.S. PATENT DOCUMENTS

| | | | |
|---|---|---|---|
| 2,769,023 | 10/1956 | Loew | 358/115 |
| 3,071,642 | 1/1963 | Mountjoy | 358/115 |
| 3,833,757 | 9/1974 | Kirk | 455/2 |
| 3,934,079 | 1/1976 | Barnhart | 455/2 |
| 4,163,254 | 7/1979 | Block | 358/84 |
| 4,225,884 | 9/1980 | Block | 358/84 |
| 4,325,078 | 4/1982 | Seaton | 358/115 |
| 4,398,216 | 8/1983 | Field | 358/144 |

FOREIGN PATENT DOCUMENTS

53885  6/1982  European Pat. Off. ............ 358/115

*Primary Examiner*—Howard W. Britton
*Attorney, Agent, or Firm*—Burns, Doane, Swecker & Mathis

[57] ABSTRACT

A method and system for providing subscription services, particularly subscription television services, involving transmissions from a remote location to a subscriber location for which payment is required for access. A cost signal containing a cost or charge associated with the transmissions is transmitted from the remote location, and a credit preferably is stored at the subscriber location. The magnitude of the charge contained in the cost signal is compared with the magnitude of the stored credit, although it need not be if cost is accumulated as in one disclosed embodiment, and access by the subscriber to the transmissions associated with the cost signal is enabled in response to the relative magnitudes of the charge and the stored credit. The magnitude of stored credit is modified by the magnitude of the charge if the subscriber chooses to access to the transmissions by the subscriber. Also, credit data associated with a payment made by an individual subscriber is transmitted from the remote location and the stored credit at the location of the individual subscriber is modified in response to the transmitted credit data. An indicator on the subscriber's decoder is automatically energized at the end of a billing period to inform the subscriber that payment is due. Upon receipt by the station operator of the payment and crediting of the payment to the subscriber, the indicator is automatically extinguished. The disclosed impulse purchase capability is particularly useful in a pay television system involving transmission for which payment for access is pre-arranged at a fixed level and transmissions for which payment for access is not pre-arranged at a fixed level.

47 Claims, 6 Drawing Figures

METHOD AND SYSTEM FOR REMOTE REPORTING, PARTICULARLY FOR PAY TELEVISION BILLING

BACKGROUND OF THE INVENTION

1. Field of the Invention

The present invention relates to a method and system for remote billing and/or other reporting for services such as pay television or the like, and particularly, to a method and system for providing purchase capability for pay television services on a prepaid, tiered basis and/or on an impulse purchase basis.

2. State of the Prior Art

Services such as broadcast and cable pay television require the collection of payment for the services provided, and various techniques have been devised for charging subscribers and assuring collection for the services. The techniques range from charging a flat rate and physically disconnecting the service if the bill is not paid to more complex per program or "per view" billing techniques and code denial such as that shown in U.S. Pat. No. 4,163,254 issued to Robert S. Block and John R. Martin.

More recent attention has been focused on tiering methods of subscriber billing. In a tiered system, a subscriber pays a flat rate for each tier or category of programming desired. The eligibility of a subscriber to watch certain tiers or categories is prearranged and the subscriber is charged a flat fee for that eligibility regardless of how many or few programs within the prearranged tiers are viewed.

Thus, for example, the subscribers may prearrange to pay one flat fee to watch a certain category of programs such as sports, another flat fee to watch another category of programs, and so on. One subscriber might thus agree to pay the sum of three flat fees to be eligible to view all programs within three categories or "tiers" (e.g., a $35.00 total for a combination of one $10.00 category or tier, one $20.00 category or tier and one $5.00 category or tier) while another subscriber might select and be eligible to view only one category or tier.

Control of tiering in the above manner is typically provided by identifying programs as falling into one or more of a plurality of categories or tiers on the basis of codes transmitted with the program material and allowing only the viewing of the correct category or categories of programs at the subscriber location such as is shown in Block and Martin U.S. Pat. No. 4,225,884. Moreover, within each tier, programs may be further categorized on the basis of program content as in U.S. Pat. No. 4,225,884.

A tiered pay television billing system has the advantage of simplicity over most per program (per view) systems in that there is no need to store information regarding programs billed and to send this information to a central billing location. However, there is occasionally a need in a tiered or flat fee system to permit a subscriber to view a program not within the tier or tiers to which he has subscribed. For example, special events such as fights, plays, certain movies, etc. may not be included in the tiered program material or may be in a tier not subscribed to by a large groups of subscribers. Also, the suppliers of program material may require payment from the subscription television operator for each subscriber actually viewing the program. It thus may be desirable and perhaps necessary to include per view billing capability within a tiered or flat fee system or to operate entirely on a per view billing basis.

In one subscription television system now in operation, tiering and/or per program billing can be provided through the use of the techniques described in the above-referenced patents. While the combination embodied in this commercial system may provide the advantages of both tiering and per program billing, there is a requirement that the subscriber periodically transmit billing information to the central billing location (e.g., by telephone) so that a bill can be formulated on the basis of that information. Alternatively, the subscriber must pay well in advance so that proper decoding information can be transmitted to the subscriber, e.g. over-the-air or by mail, cable or telephone, in advance of the scheduled program airing.

OBJECTS AND BRIEF SUMMARY OF THE INVENTION

A general object of the present invention is to provide a novel method and system for remote reporting, particularly as it relates to billing for services on an impulse basis so that a service such as pay television can be received by a subscriber to the service without prepaying or arranging in advance to pay any set fee for the service.

One object of the present invention is to provide a novel method and apparatus permitting subscribers to view certain programs on a flat fee or tiered basis and other programs on a per program basis without the need for specific program identification information in formulating bills and without the need for transmitting any specific billing information, other than periodic payments, from the subscriber to a central location.

It is a further object of the present invention to provide a novel pay television method and system in which the accounting for services selected by a subscriber is accomplished primarily at the subscriber location.

It is another object of the present invention to provide a novel pay television system and method which requires no bills to be transmitted to subscribers in order to ensure collection for services used by the subscriber.

It is yet a further object of the present invention to provide a novel pay television system and method in which subscribers can decide on impulse to purchase a program for viewing despite not having pre-notified the subscription television operator.

It is yet another object of the present invention to provide a novel method and system for alerting a subscriber to a subscription service that payment is due and then further indicating when payment has been received.

These and other objects and advantages are provided in accordance with the present invention in a system for providing impulse purchase services involving transmissions from a remote location to a subscriber location through the transmission of a cost signal containing a charge associated with the transmission. A credit preferably is stored at the subscriber location and the charge contained in the cost signal is compared with the stored credit. The relative magnitudes of the charge and stored credit are compared and the subscriber is enabled to access the transmissions in response to this comparison. If the subscriber chooses to access the transmissions, the cost associated with the transmissions modifies the magnitude of the stored credit, e.g. the cost is deducted from the credit, thereby producing a new value of the stored credit. The stored credit may also be modified by transmitting credit values from the remote location to the subscriber location.

Alternatively, the charge associated with each impulse purchase service chosen by the subscriber during a billing period is accumulated and stored. When the subscriber's payment is received by the service operator, a credit in the amount of the payment for the impulse purchases is transmitted to the subscriber location and compared with the total accumulated cost for impulse purchases during the billing period. A favorable comparison results in the continued ability of the subscriber to access impulse purchase services.

In a pay television system according to the present invention, access to subscription or "pay per view" programming is provided through the provision of an impulse purchase capability which allows a subscriber to purchase a certain amount of subscription programming outside the subscriber's normal prearranged programming at any time during which special information pertaining to that programming is being transmitted. More specifically in accordance with a preferred embodiment of the invention, a money credit of some predetermined amount is entered in storage in the pay television decoder of a subscriber wishing to have impulse purchase capability. The credit initially may represent an amount actually prepaid by the subscriber or an advance credit provided by the pay television operator against future use by the subscriber.

Each scrambled program capable of impulse purchase is transmitted with data including the cost of the program in a part of the television signal which does not convey program information (e.g., the vertical or horizontal interval or an unused portion of the audio frequency band). A unique code may also accompany the transmitted cost signal for program identification purposes. If the subscriber's decoder recognizes the program as an impulse purchase program, certain information such as the cost of the program is displayed. To view the program, the subscriber enters into the decoder an appropriate request, and the decoder automatically compares the program cost with the available credit, e.g., by temporary storage of the cost information and substraction from the existing credit. If the cost does not exceed the credit and the subscriber otherwise is eligible for impulse purchase, the program can be unscrambled and the cost is deducted from the credit or otherwise used to obtain a new credit total. Also, the unique program code, if transmitted with the cost information, is stored for subsequent retrieval as an encoded "use code" so that the subscription TV operator can be provided with a record of the impulse purchase programs viewed.

At the end of a billing period (e.g., monthly), an indicator such as a light on the subscriber's decoder is energized, indicating that it is time for the subscriber to pay his monthly charges. The light may be energized by transmitting as signal to the decoder but is preferably energized by a timer in the decoder which can be set to time out in a desired period from the central station. When the light is energized by the timer or otherwise, the monthly charge and use code are calculated and stored. The subscriber enters an appropriate request and a charge for the billing period is displayed. The displayed charge may include various service charges including any impulse purchase charges, e.g., in a pay television system, the tier charge for the period and/or the charge necessary to bring the credit for impulse purchases back to some predetermined level such as the initial credit prior to the purchase of any impulse purchase programs. Also displayed in accordance with the preferred embodiment is the use code which identifies all impulse purchase programs viewed over the billing period or at least those impulse purchase programs for which reporting is desired.

When the subscriber mails or otherwise transmits a payment to the pay television operator, the payment is credited first to the tier charge or charges for the period and then the balance to impulse purchases. The subscriber's decoder is addressed and the amount of the impulse purchase payment is transmitted to the decoder. This payment amount is entered into the decoder memory as a credit to be added to any credit balance then in the decoder. Of course, if the impulse purchase payment amount is less than the actual amount due for impulse purchases during the billing period, the credit balance will not be advanced to the initial level. Moreover, if the subscriber has viewed impulse purchase programs between the time the payment is made and the time it is credited, the credit balance may be lower than the initial level. Depending upon the amount of credit received, the light on the subscriber's decoder may be extinguished or caused to flash, or another light labeled "billing error" or the like may be energized, in order to alert the subscriber that the payment was received and it was either adequate or inadequate. Other steps such as disabling access to future services may be taken if the credit is inadequate.

In the foregoing manner, the subscriber may purchase programs on an impulse basis at least to a desired level of purchase without a need to interact with the system operator. The system operator may limit the potential for non-payment by preventing the subscriber from viewing any impulse purchase programs if the cost of the program is greater than the existing credit balance. In fact, if the amount of the credit is collected in advance, the potential loss of revenues for non-payment for impulse purchases may be eliminated.

BRIEF DESCRIPTION OF THE DRAWINGS

The present invention and the foregoing objects and advantages thereof will become more fully appreciated by one skilled in the art to which the invention pertains from the following detailed description when read in conjunction with the drawings in which.

DETAILED DESCRIPTION

Figure 1:
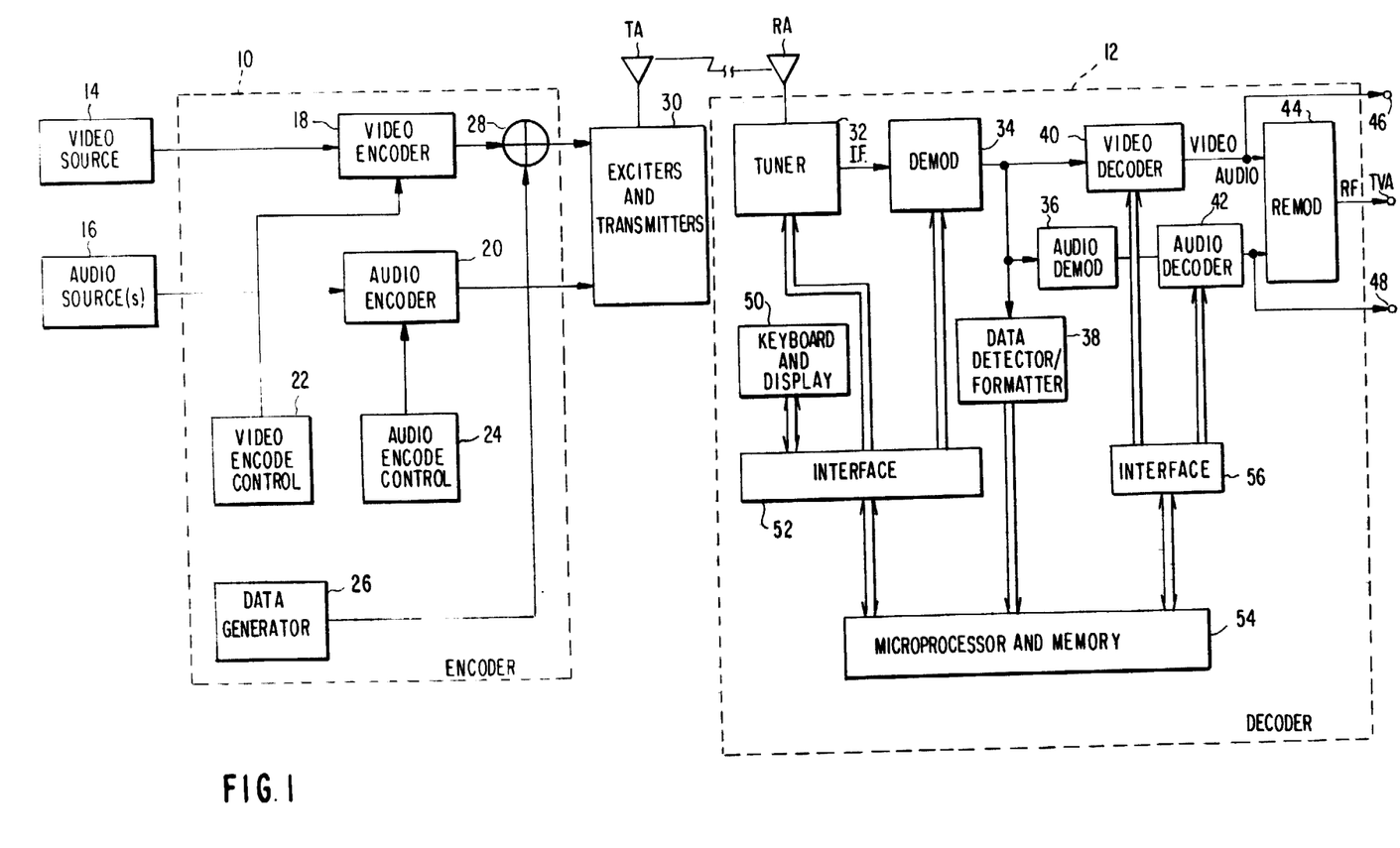
FIG. 1 is a functional block diagram of a subscription television system operable in accordance with the present invention.

FIG. 1 functionally illustrates one embodiment of an over-the-air pay or subscription television (STV) system in which an impulse purchase capability (IPC) according to the present invention may be implemented. The term STV ordinarily refers to the broadcast form of pay TV and, while this form of pay TV is illustrated, it should be understood that the principles discussed hereinafter may be used in a variety of pay TV and other applications as is mentioned hereinafter (e.g. cable, MDS-multipoint distribution systems, and DBS-direct broadcast satellite).

The illustrated system generally includes an encoder provided at a transmission station generally indicated at 10 and a decoder provided at each subscriber location as is generally indicated at 12. The encoder and decoder of FIG. 1 are provided in a subscription television system in which normal programming (e.g., "unscrambled", non-pay, commercial programming) and scrambled STV programming are transmitted and received over respective transmiting and receiving antennas TA and RA or over a cable or other transmission medium. In a multiple audio system such as is disclosed in U.S. patent application Ser. No. 188,738 of Robert W. Field et al, now U.S. Pat. No. 4,398,216, a third mode of operation with unscrambled video and multiple, selectable audios may be provided.

Normal unscrambled programming passes either through or around the encoder and decoder unaffected, except for a possible channel conversion in the decoder as will be explained. Ordinarily, the impulse purchase capability of the present invention will not be used in the normal television (TV) mode of operation. In the encoded or "scrambled" mode of operation or in multiple audio mode (hereinafter collectively referred to as subscription or STV mode of operation), the impulse purchase capability permits a subscriber to view subscription programming or select audio channels for which payment is not predetermined in some ordinary manner such as flat rate or tiering as will be explained more fully.

For example, in the illustrated subscription system, each subscriber may pay a flat monthly fee that entitles that subscriber to watch any and all of the STV programs or services within one or more "tiers" or categories of programs. For one flat monthly fee, the subscriber may be eligible to watch a "sports tier" and for another fee the subscriber may be eligible to watch a "movie tier". Control over subscriber eligibility may be accomplished by suitable tier or group (category) identifying signals transmitted with the STV program signals as set forth more fully hereinafter and as explained in detail in previously referenced Block and Martin U.S. Pat. No. 4,225,884.

On occasion during a month, a special STV program or service outside the particular subscriber's tiers or outside all tiers may be included in the STV transmissions as an impulse purchase program available for a fee in addition to the subscriber's normal monthly fee. The present invention as illustrated and described in connection with the system of FIG. 1 makes it possible for subscribers to choose to view such programs on an impulse basis rather than on a prearranged basis.

It will become apparent that the present invention, while described in connection with impulse purchase for STV programs, also may be used to provide impulse purchase capabilities for other forms of pay television as well as for other services. For example, information services and the like that a subscriber might not wish to pay for on a flat fee or tiered basis may be provided on an impulse purchase basis. Stock market reports in the form of teletext data, special audio channel services, including radio services, etc., may be accessed periodically and the subscriber may pay only on the basis of each use of that service. Alternatively, all pay TV programs or other pay TV services may be provided on an impulse purchase basis without tiering or flat rate billing to provide an entirely pay per view service.

Referring to FIG. 1, TV signals from suitable video and audio sources 14 and 16 are supplied to respective video and audio encoders 18 and 20. Encoding of the video and audio signals by the respective video and audio encoders is controlled by video and audio encode control circuits 22 and 24, as described in the previously referenced patents or in U.S. Pat. No. 4,398,216 of Robert W. Field et al. (see PCT International Publication No. W-082/01109 published Apr. 1, 1982).

A data generator 26 conventionally generates coded data (e.g., digital codes), for transmission with the TV signal, although such data may be transmitted separately from the TV signal. The data may include decoder addresses, program costs, use codes, credit data, tier codes, program I.D. codes, category codes and the like as will be described in greater detail hereinafter. In the illustrated embodiment, the data are conventionally combined with the video signal by a suitable combiner 28 and are transmitted with the video signal in a nonprogram portion thereof, e.g., the vertical interval. In this regard, a suitable sync signal such as the vertical sync signal may be used to synchronize the generation of the data with the video signal to ensure proper insertion of the data in the video signal. Of course, the data may be transmitted in the audio channel, particularly in a multiple audio system of the type disclosed in the above-referenced Field et al. U.S. Pat. No. 4,398,216.

With continued reference to FIG. 1, the video and audio signals with the desired data inserted are supplied to conventional AM and FM exciters and transmitters 30 for transmission to the decoders at each subscriber location 12. In a broadcast system, the signals broadcast via antenna TA are received via receiving antenna RA and are applied to a suitable conventional electronic tuner 32 which selects a desired TV signal (i.e., a desired channel). The tuner 32 "down-converts" the selected signal to a standard intermediate frequency (I.F.) in a conventional manner. The I.F. version of the TV signal selected by the tuner 32 is applied to a conventional demodulator 34 which converts the I.F. signal to a baseband signal.

The baseband signal from the demodulator 34 is applied to a conventional demodulator 36 for detection of the audio portion of the TV signal, a data detector and formatter 38 and to a video decoder 40 described in greater detail hereinafter. The baseband audio signal from the demodulator 36 is applied to an audio decoder 42. The video and audio signals from the respective decoders 40 and 42 are applied to a conventional remodulator 44 and may also be provided at output terminals 46 and 48. The remodulator output signal RF is supplied to the antenna terminals TVA of a TV set.

A keyboard and display unit 50 is connected through a suitable interface 52 to a conventional microprocessor and memory unit 54 as illustrated. The output signals from the data detector and formatter 38 are provided to the microprocessor and memory 54, and control signals from the microprocessor are supplied through the interface 52 to the tuner 32 and to the demodulator 34, and through a suitable interface 56 to the video and audio decoders 40 and 42.

In operation the encoder 10 does not alter the audio and video program signal in normal TV mode. Thus, during the transmission of non-STV programming, the signals from the audio and video sources 16, 14 may be routed around the encoders 20, 18 and applied directly to the exciters and transmitters 30. Alternatively, the audio and video signals may pass through the encoders but the respective controls may be set to pass the signals through the encoders unaffected. The normal TV signal can be received and utilized by both STV subscribers and nonsubscribers.

In STV mode, the video and/or audio signals are encoded (scrambled) by the encoders 18 and 20. Appropriate data signals are added to the encoded program signal and the composite signal is transmitted. Subscribers having a decoder with the proper decoding (unscrambling) and tier data can unscramble the received TV signal and supply the unscrambled signal to their TV sets for viewing and listening. Among the incoming data placed on the TV signal at appropriate times are, in addition to or as part of the data required for decoding, signals providing addressing capabilities for individual decoders, tiering and/or program content category signals, cost information signals relating to program charges for individual programs, program identification signals and credit information signals providing payment credits to individual decoders. As will be seen hereinafter, at least the cost, credit, program identification or use code and address data provide unique impulse purchase capability.

In the operation of the decoder, the subscriber tunes the tuner 32 to a desired TV channel by selecting the channel number on the keyboard 50 operating through the interface 52 and microprocessor 54 as is described more fully hereinafter. The selected signal is conventionally mixed with a local oscillator signal to obtain the desired I.F. signal, and this signal is demodulated by the demodulator 34 to obtain the TV program signal (video and audio) at video baseband.

In accordance with the preferred embodiment of the present system, the demodulator 34 employs a conventional, gated automatic gain control (AGC) circuit 40 which is gated on the TV signal color burst. For effective AGC, the AGC circuit is provided with information from the microprocessor as to the position of the color burst and the magnitude of the reference level to which the color burst level is to be gain controlled.

It will be appreciated that the position of the color burst in the TV video will ordinarily remain relatively fixed irrespective of the type of video scrambling used in the system. The position of the color burst may therefore be conventionally determined in relation to video sync signals in any suitable manner. Appropriate sync information for this purpose may be conventionally detected and supplied to the microprocessor and memory 34 from the baseband TV signal by way of the data detector and formatter 38.

The reference level for AGC may vary, however, depending on the type of scrambling used. For example, if some form of video inversion is used for scrambling, the AGC reference level will differ for inverted and non-inverted video if the scrambling method alters the normal level of the color burst. Thus, a noninverted video signal (e.g., either a portion of a scrambled signal or a nonsubscription, unscrambled video signal) requires one AGC reference level and an inverted video signal requires another level.

Accordingly, the microprocessor 54 controls the position of the AGC gate so it occurs at the same location in the video during each AGC sample while the magnitude of the AGC reference level is set by the microprocessor according to the mode of operation of the system and the nature of the incoming TV signal. In this way, the demodulator 34 can be adapted for various scrambling schemes merely by predetermining the required AGC reference levels for different decoder modes of operation, e.g., providing one AGC level for normal, non-inverted operation and another level for inverted operation. The baseband signal from the demodulator 34 includes a video portion and an audio portion within defined bands of the overall TV band width. This baseband signal is supplied to the video decoder where the video portion is unscrambled under the control of the microprocessor if the incoming signal is scrambled, the decoder is operating in the STV mode, and other criteria are met as described hereinafter. A normal video signal passes unchanged through the video decoder with the decoder in the normal mode of operation.

The baseband signal is also supplied to the demodulator 36 to produce a baseband audio signal for application to the audio decoder 42. The demodulator 36 does this conventionally as in any TV receiver using intercarrier detection, or in any other suitable manner. The audio decoder 42, like the video decoder 40, unscrambles the audio signal, if necessary, under the control of the microprocessor 54. One example of a suitable audio scrambling and decoding scheme which may be used is described and claimed in the previously referenced Field et al. U.S. Pat. No. 4,398,216.

The unscrambled audio and video signals are applied to the remodulator 44 to produce an appropriate RF signal for application to a conventional TV receiver. For example, the modulator 44 may produce an RF signal in the TV channel 3 band so that all signals passing through the decoder can be viewed on this one TV channel. In addition, the baseband audio and video signals are provided at output terminals 46 and 48 so they are available for other purposes such as information (data) transmission, teletext, etc.

In accordance with the present invention, enabling of the video and audio decoders in STV mode is controlled on the basis of a number of criteria. In an addressable system with category and tier controls as in the disclosed embodiment, the decoder 12 must be set to the proper category and, for other than an impulse purchase program or service, must have the correct tier code to make use of STV program material.

As will be seen hereinafter, the data inserted into the TV signal at the encoder 10 includes, in addition to any data necessary for unscrambling, address data for addressability of individual decoders, category and tier data for limiting access to specific categories and tiers of program material, and IPC data of various types for control of impulse purchases and billing. All of this data may be transmitted in a conventional digital code format, preferably after secure encrypting, with each data type identified in any suitable manner (e.g., by the first few digits of the signal, by the location of the data in the incoming signal, by the format of the data, etc). Data insertion and identification techniques, as well as secure encrypting and decrypting techniques, are well known in the art and any suitable technique capable of accommodating the variety of data disclosed herein may be used.

Figure 2:
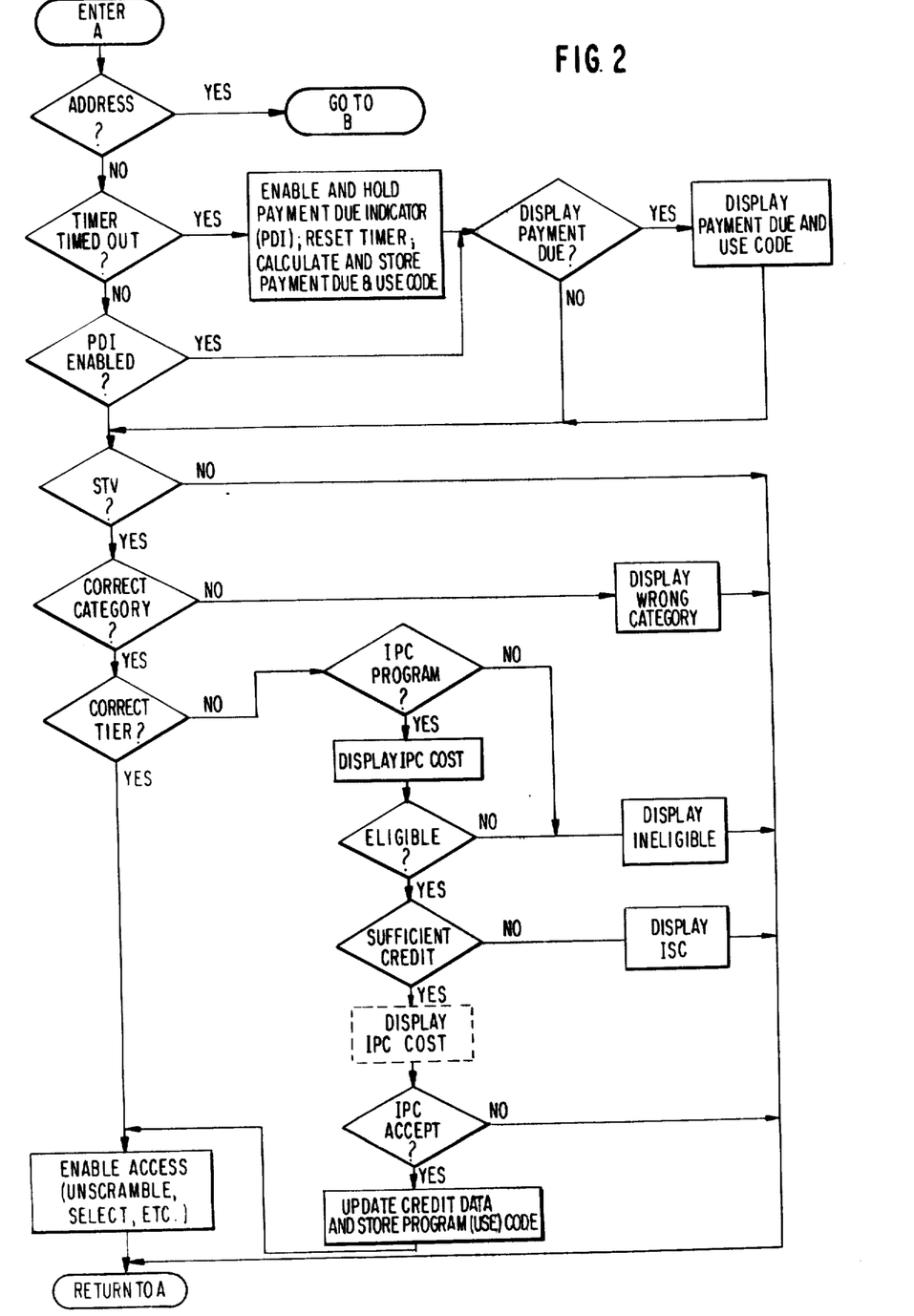
FIGS. 2-3 are logic flow diagrams illustrating the operation of the system of FIG. 1.
Figure 3:
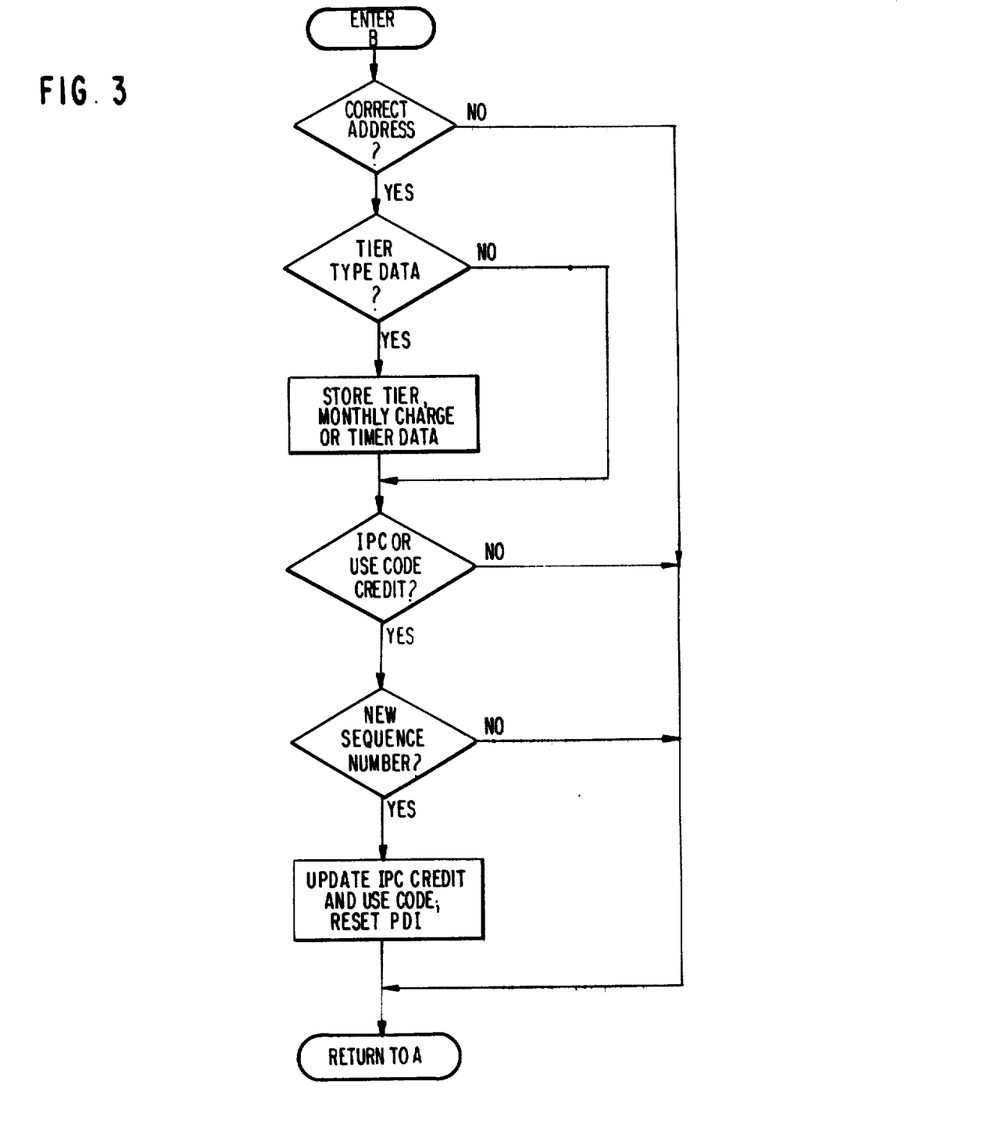

Referring to FIGS. 1-3, the data in the incoming TV signal is detected by the data detector and formatter 38 and the microprocessor 54 first makes a determination as to the nature of the data as discussed above. If the data is an address, the microprocessor 54 evaluates the address relative to a predetermined address assigned to the decoder to see if that decoder is being addressed (FIG. 3). If the correct address is being received, subsequent data or data accompanying the address is evaluated.

As will be explained in greater detail hereinafter, the decoder may be addressed for various purposes. In the illustrated embodiment the decoder may be addressed to change the tier codes, to store or alter an IPC credit, to alter the viewing record or use code and to set a timer in the decoder. As is shown in FIG. 3, if the received data following a correct address is recognized as new tier code data, the new tier data is stored. This may occur at any time the subscriber wishes to add to or otherwise alter the tiers to which he subscribes. The new tier data may be accompanied by any monthly charge data (which may be altered for various reasons including a tier change) and any timer data for presetting the decoder interval timer.

If the incoming data is IPC credit data, the credit is used to update the current IPC credit stored at the decoder. As will be seen hereinafter, this credit data update may be implemented in various ways such as by adding the incoming credit to the current credit, subtracting the incoming credit from the previous month's total cost, etc. Similarly, if the incoming IPC credit data is accompanied by use code data, the use code is updated as will be explained further.

Preferably, the IPC credit data and use code data are transmitted together, and a sequence number is included in that data. The sequence number is an arbitrary number which differs from the previous month's sequence number and can be compared with a stored sequence number so that the IPC credit will only be updated by the first block of credit data with a new sequence number. In this manner, the IPC credit and use code may be transmitted several times over some predetermined period (e.g. over a period of a few days) to ensure that the credit and use code data are received by a subscriber.

Returning to FIG. 2, the timer is continuously checked to see if it has "timed out" indicating that a payment is due. If it has timed out, a payment due indicator (e.g. a light) on the decoder display unit 50 (FIG. 1) is enabled and held, and the timer is reset. The payment due is preferably calculated and stored when the timer times out by subtracting the total IPC credit balance for the billing period from a total monthly charge comprising the sum of the tier charges and suggested IPC credit. The use code is also calculated and stored at the same time. If the subscriber requests the display of the payment due when the payment due indicator lights, the payment due (and the use code, if used) are displayed. During this display, the amount of the payment due (and the use code if one is used) is copied by the subscriber (or printed out automatically) and the payment due is sent to the station operator.

The microprocessor continues to check the incoming data as shown in FIG. 2. If the incoming program material is STV (pay) material, the microprocessor evaluates the data for category and tier codes. An incoming category code which is not within the category limit (e.g. equal to or less than the category number) set into the decoder by the subscriber results in the display of "wrong category". In this situation, the STV program material cannot be used by the subscriber without changing the category limit to which the decoder is set. The tier code in the incoming data is also evaluated against the tier code(s) stored in the decoder in order to evaluate the subscriber's eligibility to access the program material in the incoming TV signal. The tier code, however, ordinarily cannot be altered by the subscriber.

If the incoming category code is within the selected category code or the subscriber resets the category code to make it acceptable, and if the incoming tier code is one for which the subscriber is eligible, the microprocessor enables the decoder to access the program material by enabling unscrambling of the incoming audio and video signals or otherwise enabling selection of the program material (e.g., enabling selection of a particular audio channel which contains data or other services).

If the incoming category code is acceptable but there is no match of tier code, the data is evaluated to determine if the incoming program material is an IPC program which the subscriber is eligible to receive. If the program is not a IPC program, or if it is and the subscriber is not eligible for either IPC programs in general or the particular IPC program being received, the decoder indicates to the subscriber that he is ineligible by a suitable display and also displays the charge (IPC cost) for that program. If, however, the subscriber is eligible, the microprocessor preferably continues a further eligibility test based on the amount of credit stored in the subscriber's decoder With continued reference to FIG. 2, the microprocessor evaluates the subscriber's credit eligibility based on cost data associated with the incoming program. Each IPC program includes a cost signal containing a charge for that particular program. A unique identification code for that program may also be included in association with each IPC program as will be described in greater detail hereinafter. The cost of the program is compared with the subscriber's credit balance and, if there is a sufficient balance to cover the cost, the subscriber may accept the program for viewing. Moreover, if it is desired to display cost only to eligible subscribers, the cost is displayed at this time rather than earlier, as indicated in phantom. If the subscriber indicates a desire to use the IPC program material by depressing an accept button or keying in a particular code or the like, the credit and program code data stored in the decoder is updated and the microprocessor enables the decoder to unscramble or select or otherwise access the incoming IPC program material.

Figure 4:
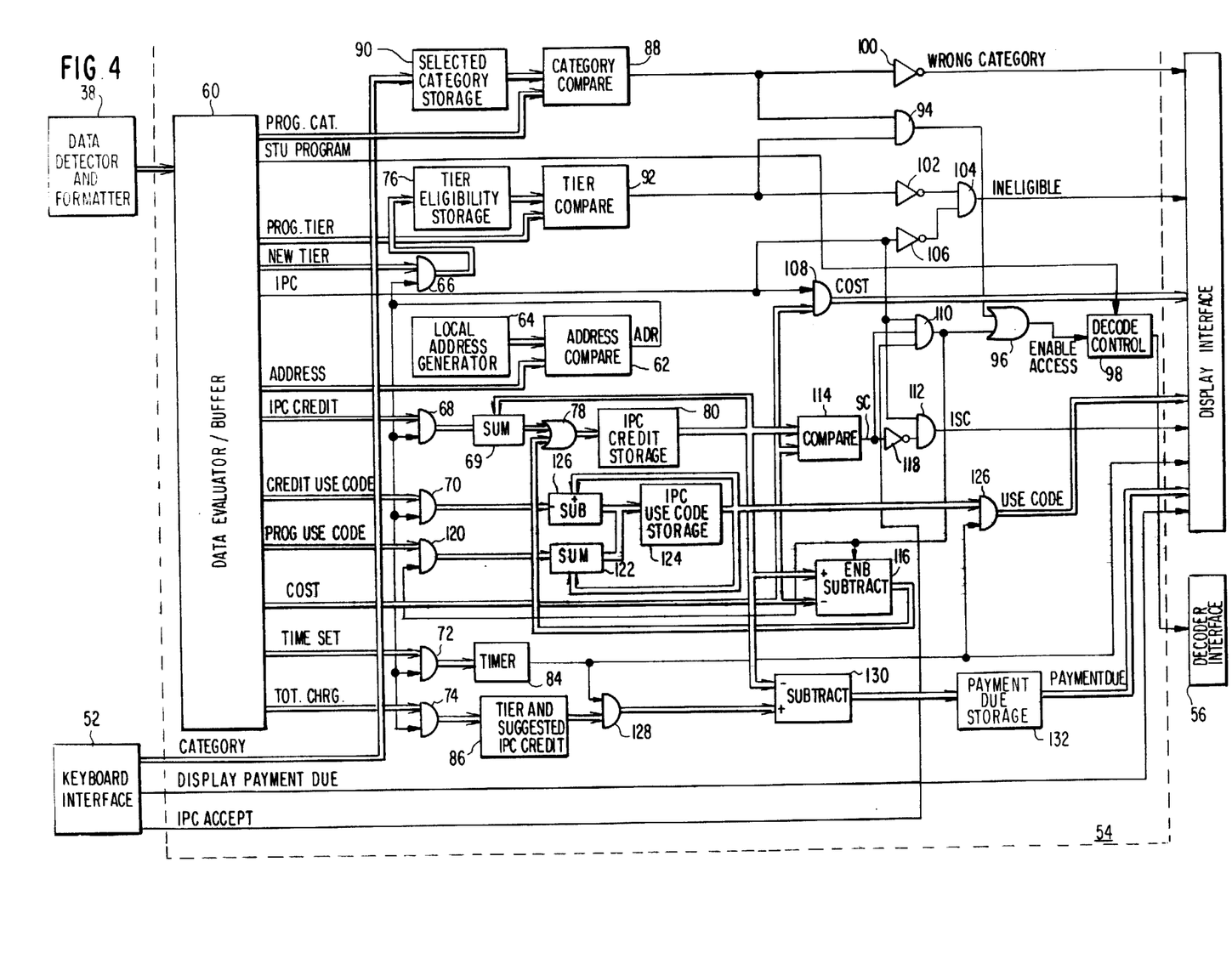
FIG. 4 is a functional block diagram illustrating in greater detail the functional operation of one embodiment of the impulse purchase provisions of the present invention.

FIG. 4 functionally illustrates the above discussed aspects of the operation of the decoder in greater detail to facilitate an understanding of the present invention. Referring to FIG. 4, the data detector/formatter 38 detects data in the incoming TV signal and arranges the data in an appropriate format for use by the microprocessor 54. The decoder and formatter may include a buffer memory so that the data may be temporarily stored until read by the microprocessor or the data may be immediately dumped into microprocessor memory set aside for this function. Either approach is conventional in data input systems used in computer processing and will not be described in any further detail.

The data from the data detector and formatter 38 is conventionally evaluated by the microprocessor 54 as indicated by the block designated "data evaluator/buffer" 60 which determines the identity of the incoming data. The manner in which the data evaluator/buffer circuit 60 operates to identify incoming data will, of course, depend upon which type of conventional data input approach is used and the manner in which the data is encoded.

Data identified by the evaluator 60 as an incoming address is compared with the output signal from a suitable local address generator 64 (e.g. a ROM) in a suitable conventional manner as indicated by block 62 designated "address compare." A favorable comparison results in a logic "1" address (ADR) output signal (e.g. a flag) which is used to control the storage of various incoming data in various storage registers or memories as is functionally indicated by AND gates 66 through 74.

Specifically, any new tier data following an address signal is shown functionally as being gated by the ADR signal through AND gate circuit 66 for storage in a suitable "tier eligibility storage" register or memory 76. The tier eligibility data in register 76 may be supplied from codes inserted by the subscriber on a periodic basis, but this data is preferably supplied in the incoming program signal (or over some other communication link such as telephone lines) by addressing or otherwise individually accessing each decoder as shown. IPC credit data following the address is shown functionally as being gated by the ADR signal through AND gate logic circuit 68, through summing circuit 69 and through OR gate circuit 78 to a suitable "IPC credit storage" register or memory 80. Similarly, IPC use code data is shown functionally as being gated by the ADR signal through AND circuit 70 to a subtractor 126 whose output signal is applied to a suitable "IPC use code storage" register or memory 82. Time set data is shown functionally as being gated by the ADR signal through AND gate circuit 72 to control a suitable "timer" 84, and total charge data is gated by the ADR signal through AND gate circuit 74 to a suitable "tier and suggested IPC credit" register or memory 86.

The program category code contained in the incoming program signal is shown functionally as being detected and compared in a "category compare" circuit 88 with a category code selected by the subscriber and supplied through the keyboard interface 52 to a "selected category" storage register or memory 90. Similarly, the tier data for the incoming program is detected and supplied to a "tier compare" circuit 92 which compares the incoming data with the tier eligibility data stored in the register 76. If the respective category and tier data compare favorably, AND gate 94 generates an enable signal which is provided through OR gate 96 to a suitable "decode control" circuit 98. The decode control circuit 98 operates through the decoder interface 56 to control the audio and video decoders of FIG. 1 in a suitable manner dependent on how the incoming signal is encoded. The STV program signal detected in the incoming data may control the decoding of the microprocessor "decode control" circuit 98 as illustrated, or the mode of operation of the decoder may be selected manually by the subscriber. If the category comparison is unfavorable (i.e. the incoming category code is not the same as or within the acceptable categories defined by the category code selected by the subscriber), the output signal from the comparator 88 inverted by an "inverter" 100 is provided as the "wrong category" signal to the display interface 52 in order to display to the subscriber that the decoder is set for the wrong category in relation to the category of the incoming signal.

The output signal from the tier comparator 92 is shown functionally as being supplied through an "inverter" 102 to one input terminal of an "AND" gate 104. The IPC signal indicating that the incoming program material is an IPC program is functionally shown as being supplied through an "inverter" 106 to the other input terminal of the "AND" gate 104 to produce an "ineligible" signal. This ineligible signal is supplied through the display interface 52 to the subscriber display unit in order to indicate to the subscriber that he is ineligible to watch the incoming program. If desired, the reason for the ineligibility may be displayed. For example, if the incoming program is in a tier for which the subscriber is ineligible and the incoming signal is (or is not) an IPC program, a "wrong tier" display may be provided in the manner of the "wrong category" display, and/or an IPC (not IPC) indication may be provided in this manner.

The IPC signal from the data evaluator/buffer 60 is also supplied to "AND" gate circuits 108, 110 and 112. The cost data in the incoming program signal is also supplied to the AND gate 108. The cost signal from the AND gate 108 is supplied to the display interface 52 for display on the subscriber display unit in order to indicate to the subscriber the cost of any IPC program being received. The output signal from a "comparator" 114 which compares the IPC credit data and cost data as will be described hereinafter in greater detail may also be applied to the AND gate circuit 108 if it is desired to display the cost data only to subscribers having sufficient credit. Moreover, in the event that it is not desired to display this cost information to an ineligible subscriber or a subscriber whose category selector is in the wrong position, gating of the cost information to the display may be further controlled by the wrong category and ineligible signals.

The cost signal supplied to the AND gate 108 is also supplied to the comparator 114 and to a "subtractor" circuit 116. The IPC credit signal from the storage register 80 is also supplied to the subtractor circuit 116 and the microprocessor thereby subtracts the cost of the incoming program from the existing IPC credit when the "subtractor" 116 is enabled by the output signal from the AND gate 110. This occurs when the incoming signal is an IPC program and the subscriber has sufficient credit to cover the cost of that program and has accepted that IPC program for viewing as indicated by the IPC accept signal from the keyboard interface 52. The output signal from the subtractor 116 is supplied through the OR gate circuit 78 to the storage register 80 in order to update the IPC credit available to the subscriber once an IPC program has been accepted for viewing under the above circumstances.

The output signal from the comparator 114 is supplied through an "inverter" 118 to the AND gate 112 together with the IPC signal as previously mentioned. If the incoming program material is an IPC program and the subscriber does not have sufficient credit to cover its cost, the AND gate 112 provides an insufficient credit signal ISC to the display interface 52 so that this lack of sufficient credit to purchase the incoming IPC program is displayed to the subscriber.

The output signal from the AND gate 110 provides the enable access signal to the decode control circuit 98 through the OR gate 96. This signal from gate 110 is also supplied to an "AND" gate circuit 120. The use code in the incoming program is supplied to the AND gate 120 and the output signal from the AND gate 120 is applied to a "summing" circuit 122. The output signal from the summing circuit 122 is supplied to an "IPC use code storage" register or memory 124 having its output signal supplied to the summing circuit 122 and to a "subtractor" 126. The credit use code supplied through the AND gate 70 upon receipt of a correct address is supplied to the subtractor 126 whose output signal is supplied to the IPC use code storage register 124. In this manner, the IPC use code storage register is updated by adding to the total use code any program use code associated with an incoming program that has been accepted for viewing and by subtracting from the use code any use code total for which the subscriber has received credit by making an appropriate payment. The signal from the use code storage register 124 is also gated through AND gate circuit 126 to the display interface 52 for display of the use code at the end of the billing cycle as will be described hereinafter in greater detail.

The timer 84 generates an output signal at the end of any predetermined time period or at the end of a time period set by the time set signal transmitted as data from the central station. Alternatively, a signal from the central station may be transmitted to the decoder to produce a control signal that performs the same function as the timer output signal.

The timer output signal is shown functionally as being supplied to an "AND" gate circuit 128, to the AND gate circuit 126 and to the display interface 52 for display to the subscriber as will be described hereinafter. The tier and suggested IPC credit data in the register 86 is also supplied to the AND gate 128. The output signal of the AND gate 128, together with the IPC credit signal from the register 80, is supplied to a "subtractor" 130 in order to subtract the total tier and suggested IPC credit from the current IPC credit. The result of this subtraction is the total payment due for any billing period determined by the timer 84. This value is stored in the payment due storage register 132 and is supplied through the display interface 52 to the subscriber display unit.

In operation, the microprocessor 54 performs all of the functions illustrated by the various blocks in FIG. 4 through suitable program control. It should be understood, however, that a hardwired logic circuit with individual or integrated logic circuits to perform the indicated functions may be utilized if desired. In this regard, all of the individual storage, gating, comparison, etc. functions are conventional and may be implemented with commercially available logic circuits.

With reference to FIGS. 1-4, most of the incoming programs will be tiered and the decode control circuit 98 will be enabled through the normal tier comparison process by way of AND gate 94 and OR gate 96. In the event, however, that the subscriber is ineligible to view an incoming program because it does not fall into one of the tiers for which the subscriber has agreed to pay, the microprocessor checks to determine if the incoming program is an IPC program. If it is an IPC program, the cost data (and if desired the fact that the program is an IPC program) is displayed.

If the subscriber decides to view the IPC program, the cost of that program is subtracted from the existing IPC credit in the IPC credit storage register 80, and the decode control 98 is enabled. In addition, the use code associated with that program is stored in the IPC use code storage register 124 by summing it with the existing use code or, alternatively, by a program code encoding technique described hereinafter. In this regard, the use code used in the FIG. 4 embodiment is preferably a unique value which, when summed with other unique use codes for programs during a billing period, will always produce a unique sum. In this manner, the use code will always provide an accurate indication of the identity of IPC programs viewed (or IPC services used) during a billing period. If very few IPC programs are delivered during a billing period, the use code may be unnecessary, particularly if the IPC programs all differ in cost. In fact, the IPC program costs may be arranged, e.g., by using odd cents, so that the total cost of any combination of IPC programs is a unique number. Moreover, program identification numbers may be recorded and encoded to provide a unique use code as is described hereinafter.

Assuming that the subscriber is operating on a monthly billing period, the timer 84 will time out at the end of the month and alert the subscriber that it is time to pay for the program services received during the last billing period. This may be accomplished by turning on a light or by other suitable indicator means on the subscriber display unit.

The timer 84 also enables the AND gates 126 and 128 and the payment due for the prior billing period is calculated and displayed along with the use code. In this connection, the payment is preferably the total of the tier charges and suggested IPC credit for that subscriber less the existing IPC credit in the storage register 80 at the time the timer 84 times out. Since this difference is stored as well as displayed, and can be retained in memory until replaced by the next month's data (or for several billing periods if desired), the total IPC charge for any one month period is available should a dispute over the bill arise.

The display of the payment due and the use code permits the subscriber to pay exactly what is shown on the display and to indicate to the station operator, by inclusion of the unique use code with the payment, exactly which IPC programs were viewed. When the station operator receives the subscriber's payment and the indicated use code, the amount of the payment less any tier charges (namely the total IPC payment) is transmitted to the subscriber as an IPC credit. Similarly, the use code is sent to the subscriber as a use code "credit." The station operator may also transmit a reset signal for resetting the payment due indicator (PDI) either as part of the IPC credit signal or as a separate signal. Alternatively, the received IPC credit or use code may be compared with the previous month's charge or viewing record to reset the PDI as is described hereinafter.

For updating credits, the subscriber is preferably addressed and these credits transmitted on a particular channel frequency (e.g., the STV channel) when the subscriber is not likely to be using his TV set or during the transmission of tiered or IPC programming. The tuner on the decoder is preferably arranged so that it is tuned to that particular channel frequency whenever the decoder is not in use so that the IPC credit and use code credit data can be received and detected to appropriately update the storage registers 80 and 124, respectively. Time set data may be similarly transmitted to individual subscribers to alter the billing period as desired, and new tier data may be similarly transmitted to the individual subscribers as subscriptions to new or different tiers are ordered. Moreover, in the event that a subscriber orders a new tier or a different tier, the tier and suggested IPC credit total may be altered by addressing the subscriber and transmitting data containing a new total expected charge for the subscriber billing period.

It will be appreciated from the foregoing that the embodiment of FIG. 4 allows a subscriber to view IPC programs up to the amount of the credit in the credit storage register 80 over the span of several billing periods without paying anything more than the tier charge. Thus, for example, the subscriber may use $3.00 of a $20.00 credit in the first month and pay only the tier charge in that month. In the following month the subscriber may use an additional $10.00 of the remaining $17.00 IPC credit without making any IPC payments and still have $7.00 of credit for subsequent IPC programs. The use code will tell the station operator that the IPC programs were viewed so that he can pay his program suppliers on the basis of viewing if such an arrangement has been made with the supplier.

Thus, with the illustrated system, the station operator has the option of allowing the subscriber to continue to purchase IPC programs until the credit is completely used up, an option which may be desirable if the credit is prepaid by the subscriber. On the other hand, if the IPC credit is an advance credit given to the subscriber without prepayment, the operator has other options. For example, if the use code indicates that the subscriber has viewed IPC programs and no payment is made for these programs, the operator may simply transmit a signal to zero the IPC credit in the IPC credit storage register 80. Alternatively, the IPC capability may be totally disabled in various ways if the received payment and use code are not comparable or if, as determined by the decoder, the IPC credit transmitted to the subscriber does not match the previous month's IPC usage cost stored in the decoder.

Figure 5:
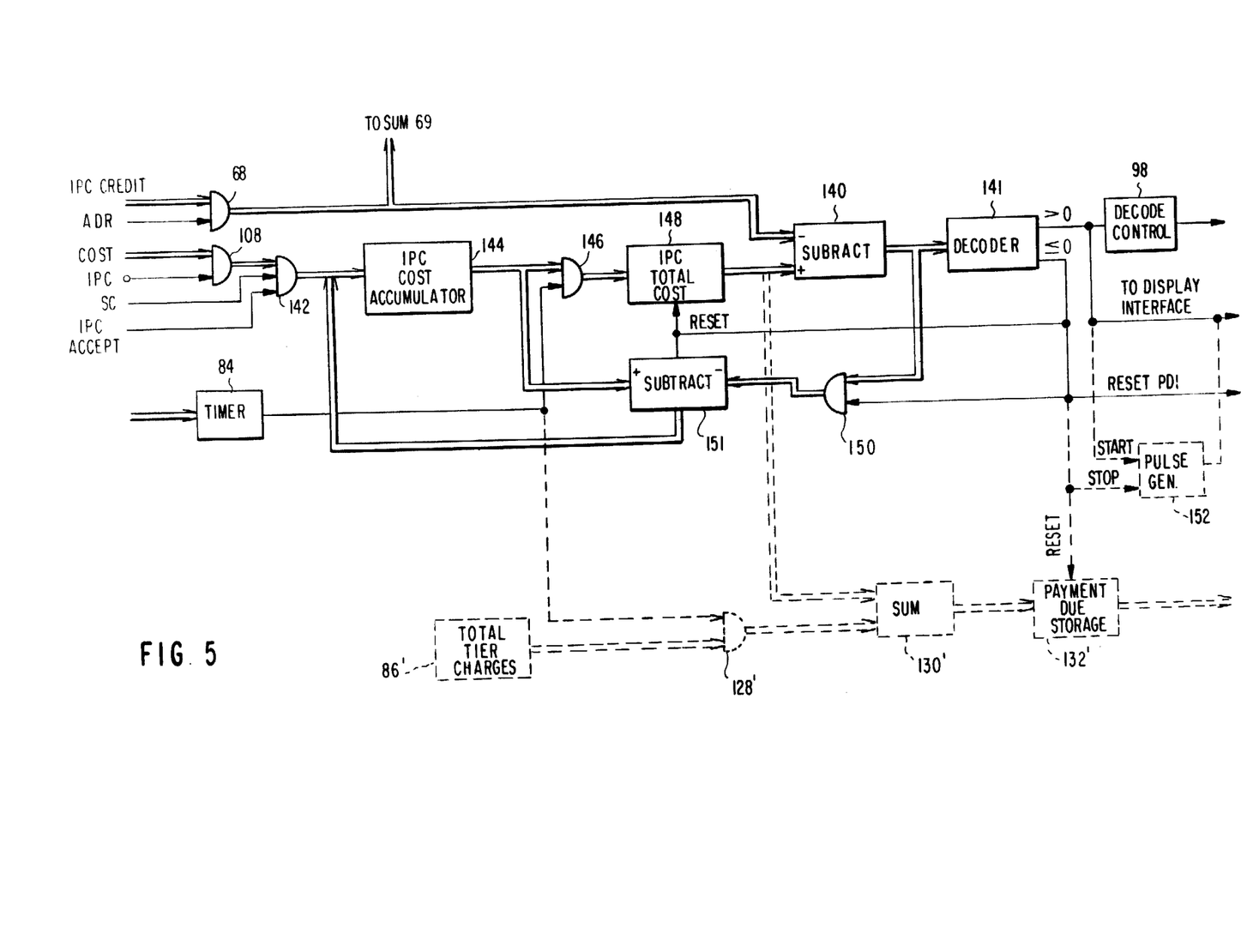
FIG. 5 is a functional block diagram illustrating the functional operation of an alternate embodiment of an impulse purchase feature which may be included in the system of FIGS. 1-5.

With reference to FIG. 5, for example, microprocessor may operate so that the "IPC credit" from the "AND" gate circuit 68 (FIG. 4) may be supplied to a "subtractor" circuit 140. The "cost" signal from the AND gate circuit 108 (FIG. 4) may be supplied to an AND gate circuit 142 together with the IPC accept signal from the keyboard interface 52 and the cost/credit comparison signal SC (FIG. 4). The thus gated cost signal is supplied from gate 142 to an "IPC cost accumulator" 144 which accumulates the sum of the charges for each IPC program accepted by the subscriber. This accumulated cost is applied to an AND gate circuit 146, the output signal of which is applied to a suitable IPC total cost register 148 which supplies its output signal to the subtractor 140. The accumulated cost signal is also supplied to a "subtract" circuit 151 for subtraction of a signal from "AND" gate 150. The subtractor output signal is supplied to the AND gate 150 and is decoded by decoder 141 for control of the decode control circuit 98 (FIG. 4) and the gate 150, and for resetting the IPC total cost register as well as controlling indicators on the display. The timer 84 output signal is applied to the AND gate 146 and is delayed a suitable amount by a delay circuit 150 and applied to a reset terminal of the accumulator 144.

In operation, the cost of all IPC programs and services used during a billing period is accumulated by the accumulator 144. When the timer 84 times out, the accumulated cost is transferred to register 148 and accumulator 144 accumulates the cost of subsequent IPC programs accepted by the subscriber.

When the subscriber's payment is received and the IPC credit is transmitted to the decoder, this credit (in addition to being added to the existing credit as described previously) is subtracted from the total IPC cost for the billing period to which the credit applies. If the credit equals or exceeds the cost, the IPC total cost register is reset, the payment due indicator is reset, and the decode control circuit 98 is unaffected (i.e. remains enabled). Also, any excess of the credit over the total accumulated cost for the previous billing period is subtracted from the accumulated cost for the current billing period. If, however, the credit is less than the accumulated cost, the decode control 98 is disabled or otherwise inhibited and a display of this condition is effected, for example, by energizing an indicator on the display or "flashing" the payment due indicator.

More specifically, the payment due indicator may remain on until an IPC credit is received from the central station and the IPC credit is compared with the total IPC cost for the billing period to which the credit applies. As is illustrated in FIG. 5, a credit less than the amount due enables a pulse generator 152 which, when enabled, provides a pulsed signal through the display interface to the payment due indicator to "flash" the indicator so that the subscriber knows that his payment was received but it was insufficient. This alerts the subscriber to the necessity of again displaying the payment due and checking his records to ensure that the correct amount was forwarded.

On the other hand, if the IPC credit equals or exceeds the stored IPC cost for the previous billing period, the payment due indicator, which has remained on from the end of the previous billing period, may be reset by the same subtractor 140 output signal which resets the cost register 148. In the foregoing manner, the subscriber is alerted automatically when a payment is due and when that payment, in the correct amount (indicator reset) or incorrect amount (indicator flashing) has been received and credited by the system operator.

It will be appreciated that with the arrangement of FIG. 5 the subscriber must pay the exact amount of or more than the IPC cost for each billing period (in addition to any tier charge) or the IPC functions are disabled. Other ways of accomplishing this same function with the cost and credit data will be apparent to one skilled in the art if it is desired to operate the IPC system in this manner.

Moreover, it will be appreciated that instead of disabling the decoder under the above circumstances, the system operator may merely wish to shorten the time of the next billing cycle by providing specific time set data to the timer 84. Only after this shortened time period without payment of the full IPC amount would the decoder be disabled.

While the FIG. 5 cost accumulator/credit comparator functions may be implemented in connection with the functions shown in FIG. 4 as an additional IPC decode eligibility requirement, it may also be used independently of the credit storage and comparison functions shown in FIG. 4. For example, the functions represented by the circuit 69, the OR gate 78, the credit storage 80, the compare circuit 114 and the subtractor 116 may be eliminated and replaced by the functions shown in FIG. 5. With reference to FIGS. 4 and 5, for example, the IPC cost may be accumulated by the cost accumulator 144 without regard to the comparison of cost and credit (i.e. without regard to the SC signal which would be eliminated from the AND gate 142).

Thus, each time the subscriber accepts an IPC program, the IPC accept signal gates the cost signal to the cost accumulator where the total charges for all accepted IPC programs is accumulated.

At the end of a billing period, the accumulated cost is stored in the total cost register 148 and is summed with the total tier charges to produce a payment due for display. In this connection, the blocks designated 86', 128', 130' and 132' may take the place of the like-numbered blocks in FIG. 4. When the IPC credit is received, it is subtracted from the total IPC cost for the billing period. A favorable comparison (a credit greater than or equal to the total cost) results in resetting the payment due indicator, resetting the total cost and payment due storage registers and enabling (or not disabling) the decode control 98. Use code transmission, calculation and storage may proceed in conjunction with the FIG. 5 embodiment as was described previously.

It can be seen that with the embodiment described above, the subscriber can access as many IPC programs as are available during a billing period. If a credit other than one greater than or equal to the total IPC accumulated cost is received (or if a zero credit is sent out after some time period during which payment is not received), the decoder is disabled so that no further IPC programs may be accessed. A credit at least sufficient to cover the accumulated cost permits the subscriber to continue using the impulse purchase capability, and any excess payment is credited to the IPC charges for the next billing period.

Figure 6:
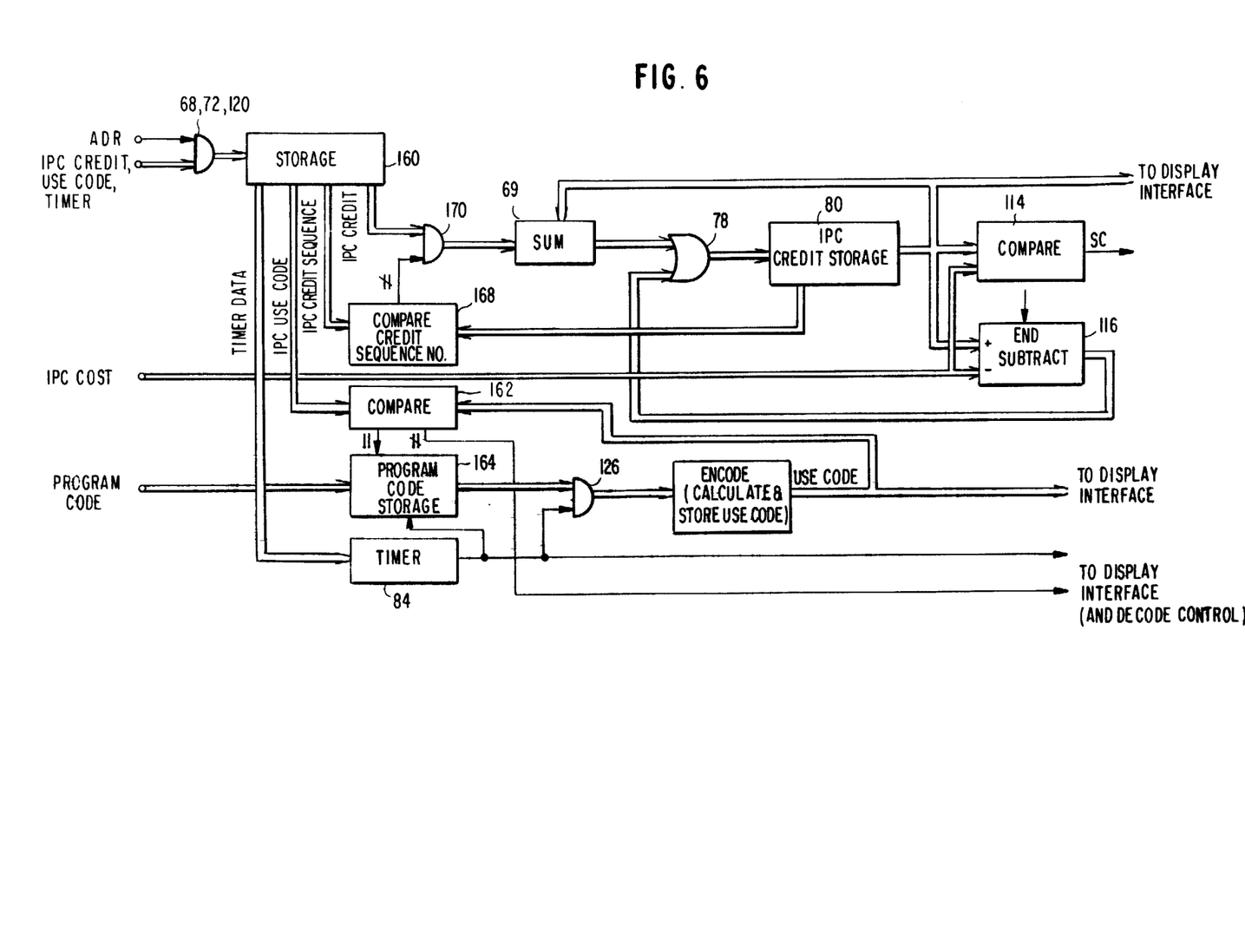
FIG. 6 is a functional block diagram illustrating the functional operation of a detailed embodiment of the credit and use code features of the present invention.

The handling of the credit data and use code data by the microprocessor 54 is functionally illustrated in detail in FIG. 6 for an alternative embodiment of the present invention. In FIG. 6, numerical designations previously used in FIG. 4 indicate the same functional blocks previously described.

Referring now to FIG. 6, the IPC credit data, use code data and timer data may be transmitted from the central location as a blocks of similar data types as was previously mentioned. When the correct address is received as indicated by the ADR signal, these blocks of IPC data are stored in memory or "storage" 160 and the positions of the data in memory determine which type of data they are. The timer data is supplied to the timer 84, and the received use code data is compared with the stored use code as indicated at 162 and used to discard the viewing record from "program code storage" 164 and to control a suitable indicator as well as further decoding, if desired. The signal from program code storage 164 is gated to an "encoder" 166 by the timer 84 output signal and the encoder output signal is supplied to the display interface as the use code.

As was previously mentioned, the IPC credit data preferably includes a credit sequence number which remains the same for a certain billing period but differs from the sequence numbers used in the previous one or more billing periods. This sequence number is compared ("compare credit sequence number" 168) with the sequence number of the credit data stored in "IPC credit storage" 80 and if they are not the same, the IPC credit is gated by "AND" gate circuit 170 to the "sum" circuit 69 and the sum of the incoming and current credits is stored.

In operation, each IPC program will be accompanied by a program code such as a number. The program number may accompany all IPC programs but, for different groups of subscribers, it may be desirable to report only part of the viewing record in order to minimize the size of the use code number which the subscriber must report. If only part of the viewing record is used to generate the use code, the same part will be used by a first group of subscribers (e.g. 10%) while another part will be used by another group, etc., thus permitting statistical sampling of program viewing rather than an actual viewing record for each subscriber.

In any event, the IPC program number is stored, for example, by inserting a bit in a memory location corresponding to the program number. This number, which would be in some binary form, is shifted by the timer output signal into appropriate locations in storage 164 and is encoded in a suitable manner such as by forming a hexadecimal, alphanumeric code. Thus, for example, if IPC programs 1, 3, 7 and 10 were viewed and corresponding bits of the register are set at the end of the billing period, the encoder 166 would transmit the code 48A to the display unit and the subscriber would send this use code with his payment. When the use code "credit" 48A is received by the decoder from the central station, this credit is compared with the stored use code by "compare" circuit 162 and the appropriate parts of the viewing record in the program code storage are discarded.

In addition to encoding the actual program viewing record in storage 164, one or more parity or check-sum bits are preferably included in the use code in any suitable conventional manner for additional security. Thus, if the use code forwarded to the station operator is purposefully or inadvertently recorded with an error, the parity or check-sum bits will alert the operator to the error before the use code credit is transmitted to the subscriber. The error may thus be corrected before further action is taken, or the error may be determinative of what further action is taken.

The IPC credit data with its accompanying credit sequence number is transmitted several times to ensure that it is properly received and "credited" by the decoder. Each time the credit data is received, its sequence number is compared with the credit sequence number of the IPC credit data in storage 80. If the sequence numbers match, this signifies that the credit data in storage is the same as that being transmitted so no credit update is required. If the sequence numbers are different, the incoming credit data is added to the credit data in memory to produce a new credit total. Of course, if the use code and timer data are also transmitted several times during a billing period, these data will also be "gated" to memory by the credit sequence comparison either by additional "AND" gate blocks between the storage 160 and the decoder 162 and timer 84 or by supplying the comparison signal from block 168 to the "AND" gate 68.

It will be appreciated that the present technique may also be useful for services other than pay television or pay radio or other transmission services. For example, the technique may be used in connection with the remote purchase of products by transmitting a product cost and identifying code while indicating on the television receiver that the subscriber may purchase the product by pressing the accept button or entering a particular code. When the subscriber takes the required steps, the cost of the product is deducted from the subscriber's credit and, if sufficient credit exists, the product code is stored. When the subscriber pays the bill for purchased services, the product cost is included and the product code tells the station operator to forward the product to that subscriber.

Similarly, services such as the home recording of programs at times when normal programming is not aired may be purchased in advance in this manner and a particular subscriber's recorder may be activated to record a movie (or other program) after payment is received and the particular program is indicated by the use code. The addressability feature coupled with the foregoing IPC features permit such control on a subscriber-by-subscriber basis.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A method for providing subscription services involving transmissions from a remote location to a subscriber location and for which payment is required for access, the method comprising the steps of:
   (a) transmitting a cost signal containing a charge associated with the transmissions;
   (b) storing a credit at the subscriber location;
   (c) comparing the magnitude of the charge contained in the cost signal with the magnitude of the stored credit; and,
   (d) enabling access by the subscriber to the transmissions associated with the cost signal in response to the relative magnitudes of the charge and stored credit.

2. The method of claim 1 including the further step of modifying the magnitude of stored credit by the magnitude of the charge in response to access to the transmissions by the subscriber.

3. The method of claim 1 wherein access to the transmissions is enabled in response to a stored credit equal to or exceeding in magnitude the magnitude of the charge contained in the cost signal.

4. The method of claim 1 wherein the subscription service is a pay television service and wherein each transmission is effected within an allocated television channel frequency band.

5. The method of claim 1 including the further steps of transmitting credit data associated with a payment made by an individual subscriber and modifying the stored credit at the location of the individual subscriber in response to the transmitted credit data.

6. The method of claim 1 wherein the subscription services involve transmissions for which payment for access is pre-arranged at a fixed level and transmissions for which payment for access is not pre-arranged at a fixed level, the method including the further steps of transmitting identifying signals in association with the transmissions for which payment is prearranged arranged at a fixed level, wherein the cost signal is transmitted only with the transmissions for which payment for access is other than at the fixed payment level, and wherein the fixed payment level transmissions are accessed by evaluating the identifying signal associated with the transmissions and enabling access to the fixed payment level transmissions in response to a predetermined identifying signal.

7. The method of any one of claims 3, 4, 5 or 6 including the further step of modifying the magnitude of the stored credit by the magnitude of the charge in response to access to the transmissions by the subscriber.

8. The method of claim 6 wherein access to the transmissions for which payment for access is other than at a fixed level is enabled in response to a stored credit equal to or exceeding in magnitude the magnitude of the charge contained in the cost signal.

9. The method of claim 8 wherein the subscription service is a pay television service and wherein each transmission is effected within an allocated television channel frequency band.

10. The method of claim 9 including the further steps of transmitting credit data associated with a payment made by an individual subscriber and modifying the stored credit at the location of the individual subscriber in response to the transmitted credit data.

11. The method of claim 2 including the further steps of:
   recording the identities of transmissions to which access is enabled and to which the subscriber requests access;
   encoding the record of said transmission identities and displaying the encoded record.

12. The method of claim 11 including the steps of:
   transmitting use data relating to the encoded record associated with a payment made by an individual subscriber; and
   modifying the record of said transmission identities in response to the transmitted use data.

13. A method for providing impulse purchase capability in a subscription television system in which access to information transmissions from a remote location to a subscriber location is at least limited to subscribers requesting access, comprising the steps of:
   (a) transmitting within at least one allocated television channel frequency band, together with the information transmissions a cost signal indicating the magnitude of the charge for access to the information in the transmissions;
   (b) storing, at the subscriber location a credit indicating an amount available for future payment of charges for access to information in the transmissions;
   (c) comparing the magnitude of the charge contained in the cost signal with the magnitude of the stored credit; and,
   (d) enabling access by the subscriber to the information in the transmissions associated with the cost signal in response to the relative magnitudes of the charge and the stored credit.

14. The method of claim 13 including the further step of modifying the magnitude of the stored credit by the magnitude of the charge in response to access to the transmissions by the subscriber.

15. The method of one of claims 13 or 14 wherein access to the transmissions is enabled in response to a stored credit equal to or exceeding in magnitude the magnitude of the charge contained in the cost signal.

16. The method of one of claims 13 or 14 including the further steps of transmitting credit data associated with a payment made by an individual subscriber and modifying the stored credit at the location of the individual subscriber in response to the transmitted credit data.

17. A system for providing subscription services involving transmissions from a remote location to a subscriber location and for which payment is required for access comprising:
(a) means for transmitting a cost signal containing a charge associated with the transmissions;
(b) means for storing a credit at the subscriber location;
(c) means for comparing the magnitude of the charge contained in the cost signal with the magnitude of the stored credit; and,
(d) means for enabling access by the subscriber to the transmissions associated with the cost signal in response to the relative magnitudes of the charge and the stored credit.

18. The system of claim 17 including means for modifying the magnitude of the stored credit in said storing means by the magnitude of the charge in response to access to the transmissions by the subscriber.

19. The system of claim 18 wherein said enabling means includes means for enabling access to the transmission in response to a stored credit exceeding the charge in the cost signal associated with the transmission.

20. The system of one of claims 17, 18 or 19 including means for transmitting credit data associated with a payment made by an individual subscriber and modifying the stored credit at the location of the individual subscriber in response to the transmitted credit data.

21. A system for providing impulse purchase capability in a subscription television system in which access to information transmissions from a remote location to a subscriber location is at least limited to subscribers requesting access, the system comprising:
(a) means for transmitting within at least one allocated television channel frequency band, together with the information transmissions a cost signal indicating the magnitude of the charge for access to the information in the transmissions;
(b) means for storing, at the subscriber location a credit indicating an amount available for future payment of charges for access to information in the transmissions;
(c) means for comparing the magnitude of the charge contained in the cost signal with the magnitude of the stored credit; and,
(d) means for enabling access by the subscriber to the information in the transmissions associated with the cost signal in response to the relative magnitudes of the charge and the stored credit.

22. The system of claim 21 including means for modifying the magnitude of the store credit in said storing means by the magnitude of the charge in response to access to the transmissions by the subscriber.

23. The system of claim 21 wherein said enabling means includes means for enabling access to the transmission in response to a stored credit exceeding the charge in the cost signal associated with the transmission.

24. The system of claim 22 wherein said enabling means includes means for enabling access to the transmission in response to a stored credit exceeding the charge in the cost signal associated with the transmission.

25. The system of one of claims 21, 22 or 23 including means for transmitting credit data associated with a payment made by an individual subscriber and modifying the stored credit at the location of the individual subscriber in response to the transmitted credit data.

26. A system for remotely billing a subscriber to a service for services requested by the subscriber during a billing period comprising:
decoder means at the subscriber location for accessing the services;
indicator means on said decoder means for indicating that a payment for requested services is due;
means for automatically enabling said indicator means at the end of a billing period; and
means remote from said subscriber location for transmitting data relating to payments for services received from the subscriber;
said decoder means including means for disabling said indicator means in response to said transmitted data.

27. The system of claim 26 wherein said transmitting means includes means for transmitting data containing a charge for the service in association with transmissions relating to the service, and wherein said decoder means includes means for storing a credit for services; means for modifying the stored credit by the amount of the charge associated with the service related transmission in response to a request for the service by the subscriber.

28. The system of any one of claims 26 or 27 wherein the indicator means is a light on said decoder means and wherein said means for enabling said indicator means includes timer means for automatically energizing said light at the end of a predetermined time period.

29. The system of claim 28 including means for remotely setting said timer means from the central location in order to control the duration of said time period.

30. The system of claim 26 wherein said transmitting means includes means for transmitting data containing a charge associated with the service and credits for payments, and wherein the decoder includes:
means for storing credit data representing a credit towards purchase of services;
means for comparing with the stored credit data the charge associated with the service in the transmitted data; and
means for enabling access to the service in response to said comparing means.

31. The system of claim 30 wherein said decoder includes means for requesting access to a service and means for modifying the stored credit data in response to said enabling means and said access requesting means.

32. A method for remotely billing a subscriber to a service for services requested by the subscriber during a billing period comprising the steps of:
automatically enabling an indicator at a subscriber location to indicate that a payment for requested services is due;
crediting at a central location payments received from the subscriber;
transmitting from the central location to the subscriber location data relating to the receipt of payments from the subscriber; and,
disabling the indicator at the subscriber location in response to the transmitted data.

33. The method of claim 32 wherein the service is requested by the subscriber on an impulse basis and including the steps of:
transmitting a charge in association with the service to thereby indicate the cost of using the service;

storing the charge associated with the service in response to an impulse request by the subscriber for the service;

modifying the stored charge in response to the transmitted data.

34. The method of claim 32 wherein the service is requested by the subscriber on an impulse basis and including the steps of:

transmitting data containing a charge associated with use of the service;

comparing the charge associated with the service against a credit stored at the subscriber location;

enabling access to the service in response to a stored credit exceeding the charge associated with the service; and modifying the stored credit by the amount of the charge associated with the service in response to an impulse request for the service by the subscriber.

35. The method of any one of claims 32, 33 or 34 wherein the indicator is a light on a display at the subscriber location and wherein the indicator is enabled and disatled, respectively, by energizing and extinguishing the light.

36. The method of any one of claims 33 or 34 wherein the service includes transmission of information from the central location to the subscriber location, and wherein the information has an identifying signal associated therewith, the method including the step of producing a record at the subscriber location of each identifying signal associated with a service in response to an impulse request for that service.

37. A method for providing subscription services to a subscriber in a system involving transmission from a remote location to a subscriber location wherein payment is required for access to the services, the method comprising the steps of:

(a) transmitting from the remote location a cost signal containing a charge associated with the subscription services;

(b) accumulating and storing charges for each service accessed by the subscriber during a billing period;

(c) transmitting credit data from the remote location to the subscriber location after the end of the billing period, the credit data containing a credit associated with the billing period; and (d) comparing the magnitude of the stored accumulated charges for the billing period with the transmitted credit in the credit data and enabling access by the subscriber to services subsequent to the magnitude comparison in response to the relative magnitudes of the stored accumulated charges and the credit.

38. The method of claim 37 wherein access to the transmissions is enabled in response to a stored credit equal to or exceeding in magnitude the magnitude of the total accumulated charges.

39. The method of claim 37 wherein the subscription service is a pay television service and wherein each transmission is effected within an allocated television channel frequency band.

40. The method of claim 37 including the further steps of storing a credit at the subscriber location, the stored credit at the location of the individual subscriber in response to the transmitted credit data.

41. The method of claim 40 including the further step of modifying the magnitude of the stored credit by the magnitude of the charges in the cost signal in response to access to the transmissions by the subscriber.

42. The method of claim 40 wherein each access to the services is enabled in response to a stored credit equal to or exceeding in magnitude the magnitude of the charge contained in the cost signal.

43. The method of claim 42 wherein the subscription service is a pay television service and wherein each transmission is effected within an allocated television channel frequency band.

44. The method of claim 37, 38, 39, 40, 41, 42 or 43 including the further steps of:

recording the identities of each service accessed by the subscriber; and, encoding the record of said transmission identities and displaying the encoded record.

45. The method of claim 44 including the steps of:

transmitting use data relating to the encoded record associated with a payment made by an individual subscriber; and modifying the record of said identities in response to the transmitted use data.

46. A system for providing subscription services to a subscriber in a system involving transmissions from a remote location to a subscriber location wherein payment is required for access comprising:

(a) means at the remote location for transmitting a cost signal containing a charge associated with the transmissions;

(b) means for accumulating and storing charges for each service accessed by the subscriber during a billing period;

(c) means for transmitting credit data from the remote location to the subscriber location after the end of the billing period, the credit data containing a credit associated with the billing period; and (d) means for comparing the magnitude of the stored accumulated charges comparing the magnitude of the stored accumulated charges for the billing period with the transmitted credit in the credit data and enabling access by the subscriber to services subsequent to the magnitude comparison in response to the relative magnitudes of the stored accumulated charges and the credit.

47. In a pay television system in which at least some individual programming may be selectively accessed by subscribers in return for a payment relating to such programming and wherein the identity of such programming accessed by a subscriber is desired, a method for identifying which of such programming has been assessed by a subscriber comprising the steps of:

(a) transmitting data with such programming including at least the cost thereof;

(b) accumulating data transmitted with such programming in response to access thereto by any subscriber to form a stored, unique code from which individual programs can be identified;

(c) displaying said unique code to the subscriber at the time payment is required from the subscriber;

(d) receiving said unique code from the subscriber at the time payment is made; and, (e) returning said unique code to the subscriber location and comparing the returned code with the stored, unique code in order to test the accuracy of the unique code received from the subscriber.

* * * * *